United States Patent [19]
Larson et al.

[11] 3,933,561
[45] Jan. 20, 1976

[54] PROCESS FOR MANUFACTURING ULTRATHIN POLYMER MEMBRANES AND PRODUCTS DERIVED THEREFROM

[75] Inventors: Roy E. Larson, St. Paul; Ralph H. Forester, Jr., Minneapolis, both of Minn.

[73] Assignee: North Star Research Institute, Minneapolis, Minn.

[22] Filed: Mar. 27, 1974

[21] Appl. No.: 455,059

[52] U.S. Cl. .............. 156/246; 156/247; 156/249; 264/212; 264/298; 428/304
[51] Int. Cl.² .......................................... B32B 31/00
[58] Field of Search ............ 264/212, 298; 156/246, 156/247, 249; 117/119.6, 119.8; 428/304

[56] References Cited
UNITED STATES PATENTS

| | | | |
|---|---|---|---|
| 3,073,733 | 1/1963 | Mitchell | 161/164 |
| 3,551,244 | 12/1970 | Forester et al. | 264/298 |
| 3,650,880 | 3/1972 | Tieniber | 156/246 |
| 3,687,772 | 8/1972 | Klenk et al. | 156/246 |
| 3,810,814 | 5/1974 | Herrick et al. | 161/159 |
| 3,843,436 | 10/1974 | Yanagida et al. | 156/246 |

*Primary Examiner*—William J. Van Balen
*Attorney, Agent, or Firm*—Thomas M. Meshbesher

[57] ABSTRACT

Unsupported ultrathin polymer film is made in bulk form by floating the film on a bath, transferring the floating film to a release substrate, drying the resulting film/substrate composite, separating the film from the substrate, and retrieving the unsupported film, e.g. in the form of a convoluted roll provided with anti-blocking agent in between the convolutions. The bulk product can be made into thermal insulating material, flake-like weather modifying agents, etc.

10 Claims, 12 Drawing Figures

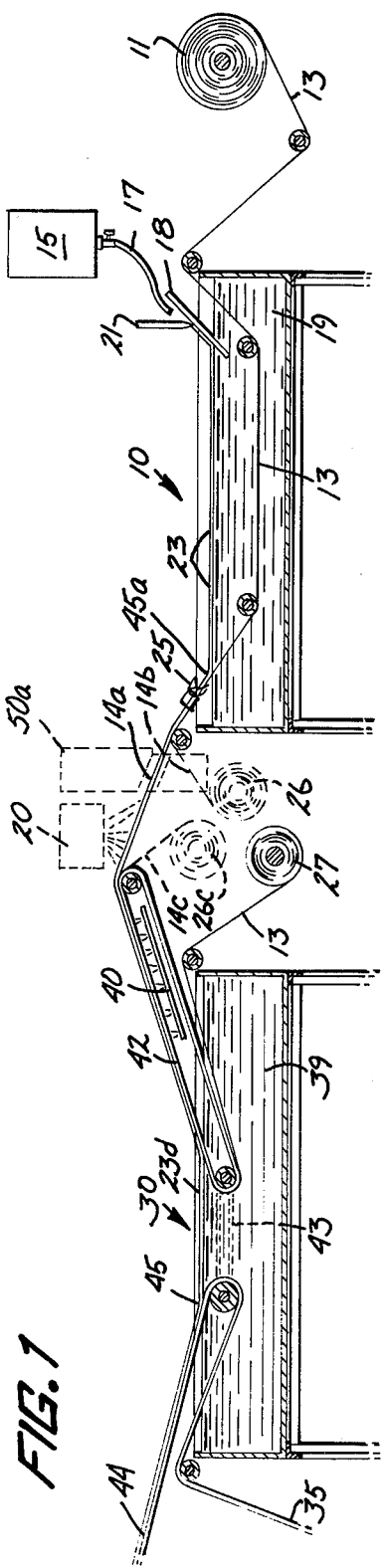

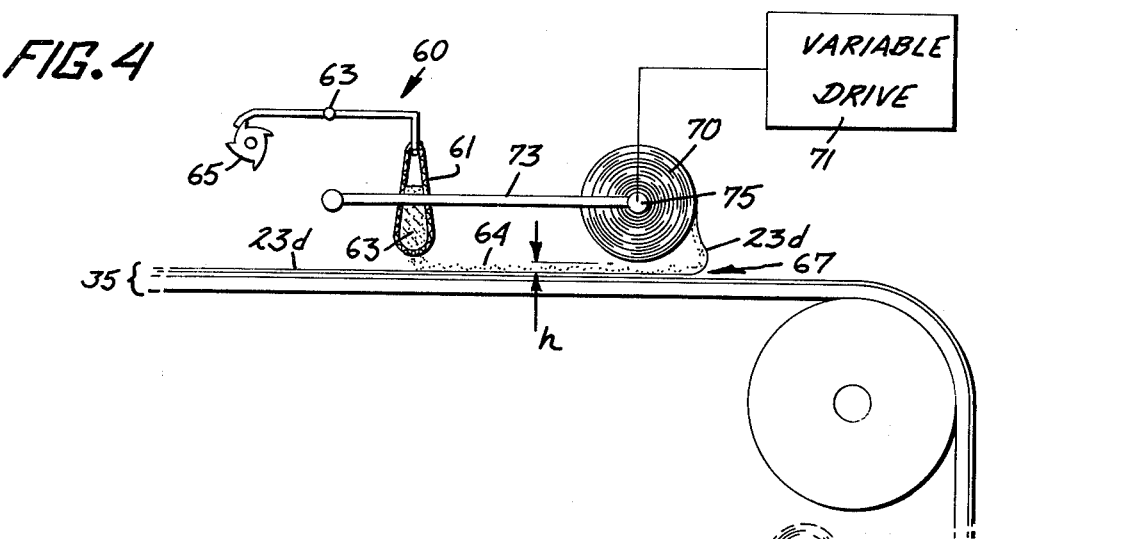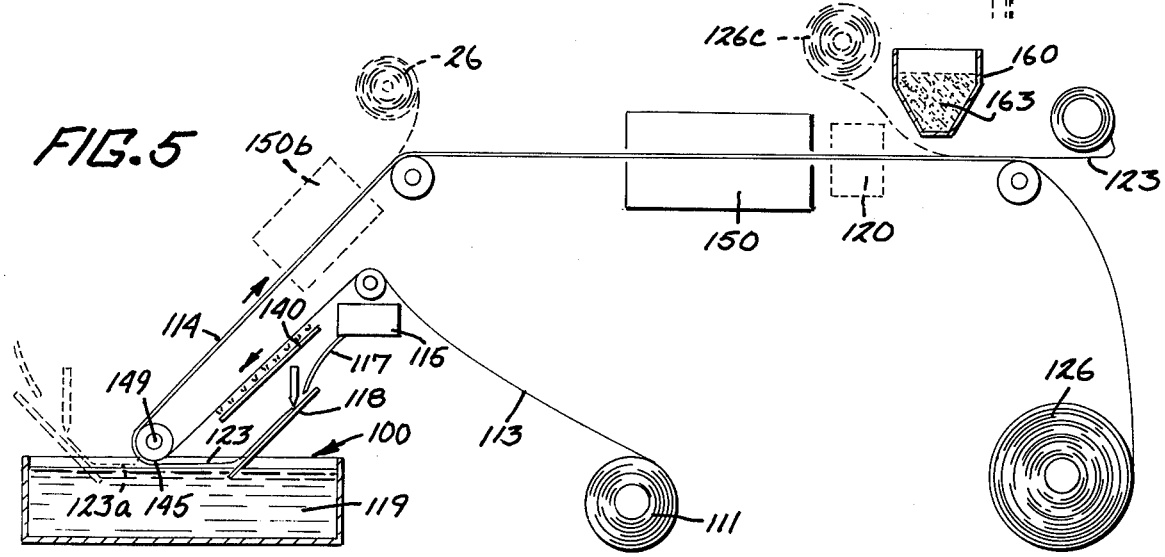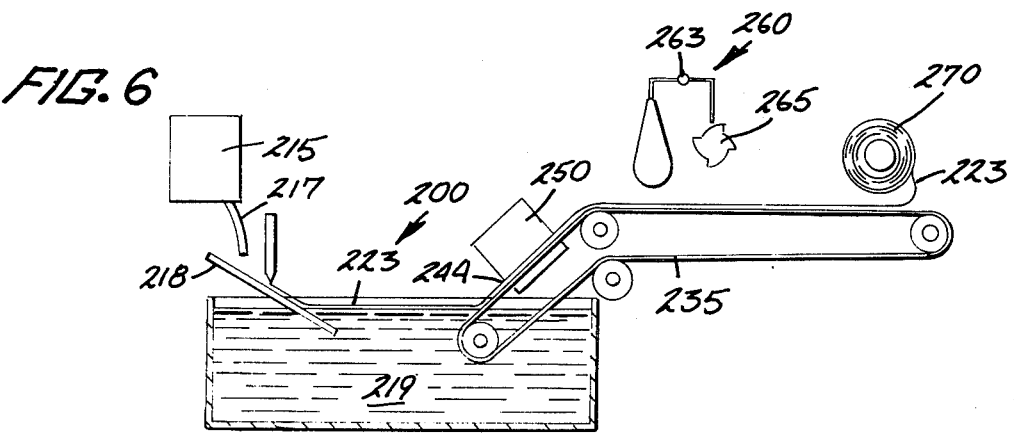

PROCESS FOR MANUFACTURING ULTRATHIN POLYMER MEMBRANES AND PRODUCTS DERIVED THEREFROM

FIELD OF THE INVENTION

This invention relates generally to ultrathin polymer films formed by casting a solidifiable polymer or polymer solution on a liquid surface. An aspect of this invention relates to loosely bound laminates formed from ultrathin polymer films. A further aspect of this invention relates to methods for separating an unsupported ultrathin polymer film from such loosely bound laminates and to the manufacture of useful products (such as thermal insulation) from the retrieved, unsupported ultrathin polymer film.

DESCRIPTION OF THE PRIOR ART

"Ultrathin" polymer films are so-called because they are thinner than the thinnest polymer films made by conventional film forming and drawing or stretching techniques. Ordinarily, the commercially available polymer films can be drawn or stretched to a thickness of about 0.1 mil (2.5 microns), but any thinner caliper must ordinarily be obtained by special casting techniques, e.g. casting a polymer solution on the surface of a liquid bath. A reasonably complete summary of the prior art relating to the formation of ultrathin polymer films is contained in the disclosures of U.S. Pat. Nos. 3,551,244 (Forester et al.), issued Dec. 29, 1970 and U.S. Pat. No. 3,580,841 (Cadotte et al.), issued May 25, 1971. Further prior art background relating to the casting of polymer films on liquid baths or the like can be obtained by referring to the following representative U.S. Pat. Nos.:

1,920,118 (Walsch it al), issued July, 1933;
2,562,373 (Arnold), issued July, 1951;
2,689,982 (Chynoweth), issued September, 1954.

Ultrathin polymer films, e.g. those made according to the teachings of the aforementioned Forester et al and Cadotte et al patents, particularly those having a thickness less than 2.5 microns (e.g. as thin as 0.05 microns) have some peculiar properties not possessed by thicker films. One of these properties is an unusually strong "blocking" tendency, i.e. a tendency to autogenously bond to itself and to a wide variety of substrates, particularly when the ultrathin film floating on the formation bath is picked up by a substrate. (The term "blocking" is also used in the paper industry to describe the tendency of paper sheets to stick to each other.) The precise nature of this blocking tendency is not fully understood. Theoretical considerations indicate that cohesive forces between the ultrathin film and any of a wide variety of substrates should be very strong, particularly when compared to the inherent tensile strength of the film itself. Thus, once the ultrathin film is bonded to a substrate to form a laminate, the ultrathin film cannot ordinarily be dislodged, separated, or otherwise retrieved or recovered from the laminate.

It is known that particles (e.g. flakes) of ultrathin polymer film can be prepared in unsupported form by breaking up the freshly formed ultrathin film and suspending the resulting flakes in a liquid carrier such as water to form a highly viscous suspension. However, removal of the liquid suspending medium results in coalescing of the flakes to form a solid mass. See column 2, line 41 et seq., of Forester et al., U.S. Pat. No. 3,551,244.

The strong blocking or adhering tendency of the ultrathin film can be useful in certain applications, e.g. when formation of a composite reverse osmosis membrane of the type described in Cadotte et al. is desired. These composite membranes comprise a porous support permanently bonded to the ultrathin film. However, there are other circumstances wherein recovery or retrieval of unsupported, dry ultrathin film is desirable. See U.S. Pat. Nos. 2,631,334 (Bailey), issued Mar. 17, 1953 and U.S. Pat. 3,031,721 (Friedlander), issued May 1, 1962, particularly column 3, line 37 et seq. of this reference. As will be readily apparent from a consideration of the peculiar properties of ultrathin film (including its blocking tendencies and its low inherent strength), recovery of the unsupported film or membrane calls for extremely delicate techniques. In fact, it would appear that continuous recovery or retrieval for high volume production of dry, unsupported ultrathin polymer film products may be utterly impractical. It would also appear that the uses for such products might be limited to exotic fields.

Accordingly, this invention contemplates a process involving retrieval of ultrathin polymer film, so that a variety of useful ultrathin polymer products can be produced in quantity.

SUMMARY OF THE INVENTION

It has now been found that it is possible to select or manipulate a support or substrate (which can be a flexible web or layer) such that the support has release characteristics, even with respect to ultrathin polymer films less than 2.5 microns in thickness. These release characteristics permit an unsupported polymer film to be retrieved from the support after separation from the support with water, steam, compressed air, and the like. For example, it has been found that many types of cellulosic materials used as support material result in the formation of a separable composite or a loosely or reversibly bound laminate which can serve as the intermediate for the retrieval of the unsupported ultrathin film. It has also been found that a partially moistened support (particularly one with a rough surface) can have release characteristics.

Further discoveries involved in this invention include retrieval techniques, whereby the unsupported polymer film can be continuously taken up in convolted form or the like without self-welding or autogenous bonding of individual laminae or convolutions to each other. This retrieved web of batt or roll of ultrathin film can be further processed (e.g. cut into a mass of dry, discrete flakes) or used as is, e.g. for thermal insulation. The dry, free-flowing flake like material can be used in filters, dust collectors, heat insulators, weather modification (e.g. dissipating a fog bank), thickening of liquid materials, and the like.

In the present invention, it is not necessary that a film of liquid separating the ultrathin polymer film from its support be present when the ultrathin film is separated as an unsupported film capable of retreival in convoluted form or the like. On the contrary, it is preferred that the separable composite or laminate described previously be in a dry or nearly dry state when this separation step is carried out.

BRIEF DESCRIPTION OF THE DRAWINGS

FIG. 1 is a schematic representation of apparatus and materials fed to or processed in the apparatus, wherein the apparatus is constructed and arranged to carry out one embodiment of the flotation and supporting steps of a process of this invention, and wherein the flotation step is preceded by the formation of a separable composite or laminate.

FIG. 2 is a schematic representation of additional apparatus constructed and arranged to carry out an embodiment of the drying, dusting (anti-blocking), separation, and retrieval steps of this invention.

FIG. 3 is a cross-sectional view, greatly enlarged, of an ultrathin film supported according to the supporting step of this invention, which step is shown schematically in FIG. 1.

FIG. 4 is a schematic representation showing the dusting, separation, and retrieval zones of FIG. 2 in greater detail.

FIG. 5 is a schematic representation of apparatus constructed and arranged to carry out another embodiment of the flotation, supporting, drying, dusting (anti-blocking), separation, and retrieval steps of this invention.

FIG. 6 is a schematic representation of apparatus constructed and arranged to perform another embodiment of the flotation (casting), supporting, drying, dusting (anti-blocking), seperation, and retrieval steps of the process of this invention.

DEFINITIONS

Figure 8:
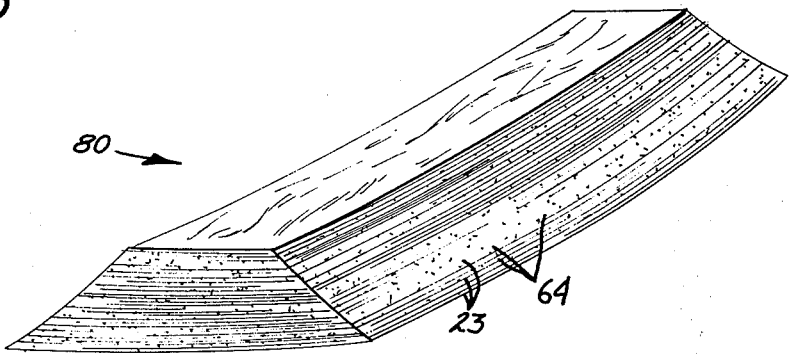
FIG. 8 is a perspective view of a batt made according to this invention, wherein the batt has been dusted (given an anti-blocking treatment).

"Release", as in "release layer" or "release substrate", "release characteristics", etc. refers to the tendency of a surface to form a weak or reversible adherent bond or no bond at all with an ultrathin film or membrane.

"Ultrathin" refers to a thickness of less than 2.5 microns (25,000 Angstroms).

"Blocking" refers to the tendency of a surface of a film, membrane, sheet, or the like to spontaneously bond or adhere to itself or other surfaces, with little or no application of pressure.

"Retrieval" refers to conversion of an ultrathin film or membrane into an easily handled bulk form, e.g. a mass of dry, discrete, non-blocking flakes; a multi-layer, edge-bonded batt or stack of membranes; a convoluted roll of continuous ultrathin film; etc.

DETAILED DESCRIPTION

As will become clear from the following description, there are several ways in which the objectives of this invention can be achieved. Generally speaking, the invention seeks to provide a free, unsupported, ultra-thin polymer film or membrane in a useful form. That is, in products produced by this invention, neither surface of the membrane is laminated to a support layer or substrate; yet, the unsupported membrane is in a form which can be used in thermal insulation, filters, dust collectors, airborne weather-modifying agents, thickening of liquid materials, and the like, with or without further processing or fabrication steps. For example, a convoluted roll of retrieved ultrathin film of this invention can be cut into a multi-layered material, ranging from less than a milimeter up to several centimeters (e.g. 30cm) in thickness, which, except for its smooth outer surfaces, resembles a non-woven web or batt. This batt-like material has superior heat insulating properties as compared to conventional non-woven, fibrous webs or batts, and, in addition, can be lighter in weight. A suitable form of this batt-like material (e.g. its edge-bonded form which will be described subsequently) can form part of the lining of a winter coat, sleeping bag, or the like. A further feature of the batt-like material is that each ultrathin layer can have been metallized on one or both surfaces to enhance the heat insulative properties. The batt-like material or some other form of the ultrathin film can be cut or comminuted to form small dry flakes which have the ability to remain airborn for long periods of time due to their extremely light weight. These flakes can be used, for example, to help dissipate a fog-bank.

The processes of this invention have been devised to make possible the manufacture of these unique products in large or commercial quantities. Typically, these processes are continuous or semi-continuous and involve the steps of:

floating an ultrathin membrane on the surface of a liquid bath (the flotation being made possible by surface tension or other surface effects and/or by using a bath having a higher specific gravity than the membrane polymer); transfering the ultrathin film floating on the bath to a release substrate; full or partial drying of the ultrathin film and release substrate; separation of the ultrathin film from the release substrate; and retrieval of the free, unsupported, dry ultrathin film in the desired form or in an easily handled and processed form which can be converted to the desired form.

The various embodiments of the preferred process of this invention can be better understood by referring to FIGS. 1 – 7 and 12 of the Drawing.

FIG. 8 – 11 of the Drawing illustrate retrieved or retrieved and partially processed or modified products which can be obtained according to the teachings of this invention.

To the extent possible, like numerals are used to denote like elements in the various views of the Drawing.

Turning now to FIGS. 1 – 6, it will be noted that the apparatus used to practice the process of this invention is relatively simple in concept (if not in actual design) and in many instances, well-known or conventional pieces of equipment can be used. For example, the water baths and associated polymer casting equipment, moving belts and webs, supply rolls, take-up rolls, drive and gearing mechanisms, dryers, and the like can be essentially the same as or based upon known equipment configurations. See, for example, FIGS. 1 and 2 of U.S. Pat. No. 3,551,244 (Forester et al.), issued Dec. 29, 1970 and NIH Report No. NIH-NHLI-71-2364D-1 (August, 1972). Wherever possible, the less well known types of equipment or unconventional equipment used in this invention will be described in detail, but the arrangement and structure of the more conventional pieces of equipment will be readily apparent to those skilled in the art.

In the embodiment of the process of this invention shown in FIG. 1, a formation bath 10 similar to the apparatus shown in FIGS. 1 and 2 of U.S. Pat. No. 3,551,244 is used to produce a separable laminate or composite 14a or 14c comprising a release substrate 13 and an ultrathin polymer membrane 23 releasable or reversibly laminated thereto. Except for the fact that the separable composite 14a or 14c, after complete drying in dryer 50a, will quickly release the ultrathin membrane 23 upon immersion of the composite 14a or 14c into a liquid bath (e.g. a water bath), all of the equipment and process steps shown in or in connection with formation bath 10 can be essentially similar to those of the aforementioned Forester et al. U.S. Pat. No. 3,551,244. However, due to the unusual capability of separability possessed by composite 14a or 14c the ultrathin polymer film 23 can be quickly delaminated and floated off of the substrate 13 in bath 30. The resultant floating film 23d can then be taken up by a second flexible release substrate 34 to form a second separable composite 44, which can be conveyed to the drying and separation and retrieval zones which will be described subsequently. The other illustrated embodiments of this invention generally make use of the same or similar zones, which are illustrated by FIGS. 2 and 4 of the Drawing.

In another embodiment of this invention shown in FIG. 5 of the Drawing, flotation of the ultrathin polymer film 123 by casting is achieved directly (i.e. without delamination of a separable composite) by casting the liquid polymer or polymer solution 115 on the surface of bath 100. The floating ultrathin membrane or film 123 is taken up by adherence to a flexible release substrate 113. In this embodiment, flexible release substrate 113 is passed over a roller 149, which is placed such that the flexible substrate 113 passing over roller 149 does not form a meniscus at the upper surface of the liquid in bath 100. However, substrate 113 does contact the freshly formed ultrathin film 123 to form a separable composite 114 which can be conveyed to the aforementioned drying and separation and retrieval zones.

FIG. 6 illustrates still another embodiment of the invention wherein a single bath 200 is again used for both casting of an ultrathin film and flotation of the film so that it will contact a flexible release substrate 235 and form a flexible, separable composite 244 which can be dried, retrieved, etc.

The operation of the process of this invention and the various specific embodiments of it will now be described in greater detail.

THE PROCESS

Figure 12:
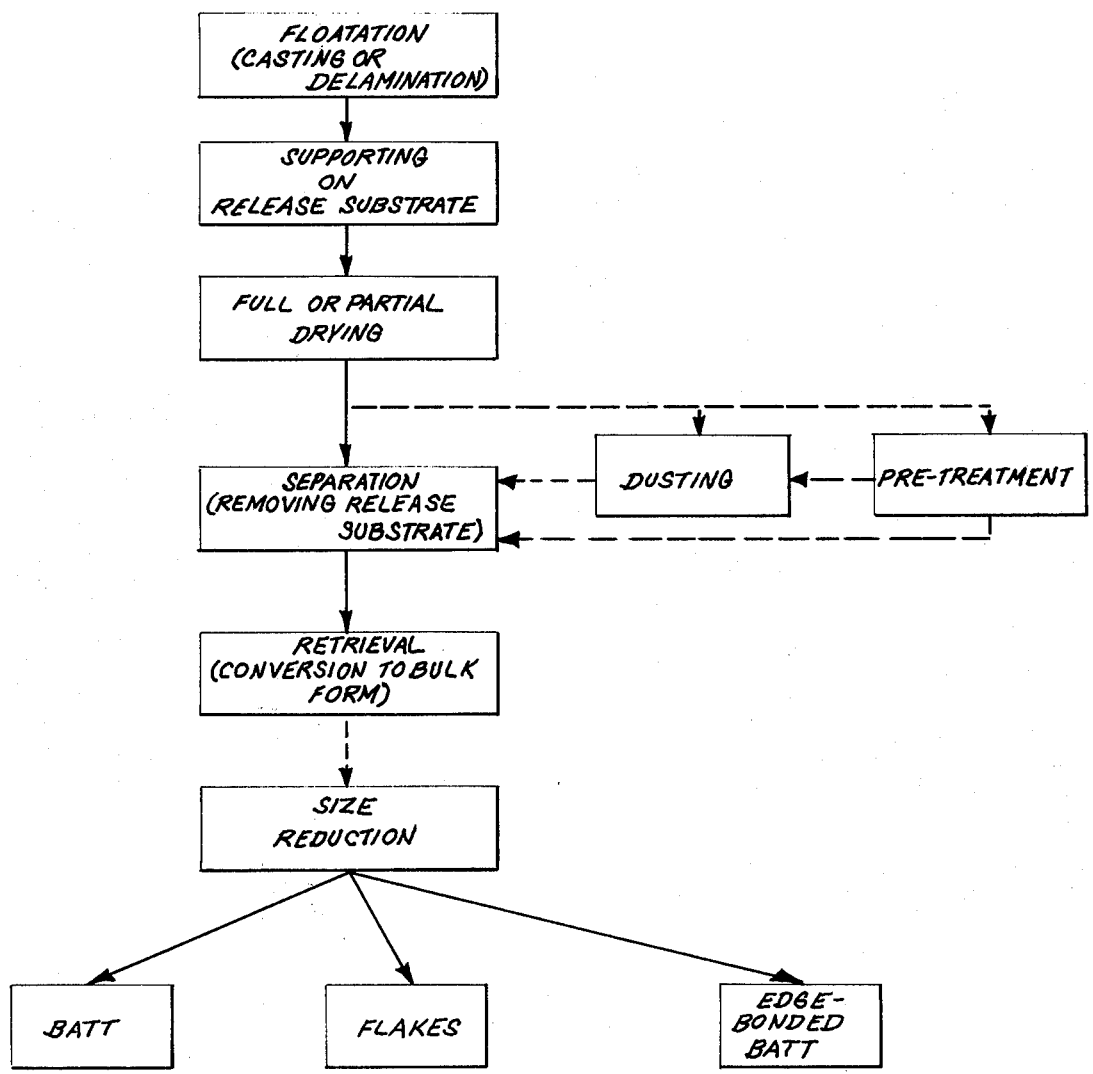
FIG. 12 is a flow sheet illustrating various aspects of this invention.

Referring now to FIG. 12 as well as FIGS. 1 – 7, the first step in the process of this invention is, generally speaking, the flotation of an ultrathin polymer film on a liquid bath which supports the film through its higher specific gravity and/or surface tension phenomena or the like. As shown in FIG. 1, flotation can be accomplished by immersing a separable composite 14a or 14c into a flotation bath 30. In this case, the ultrathin polymer film 23 has already been formed and loosely or reversibly or separably laminated to a flexible release layer 13. When the composite 14a or 14c reaches the surface of the liquid 39 in the bath 30, release or separation is virtually immediate and a free ultrathin film 23d floats away from the substrate 13 which is taken up, free of its ultrathin coating, on a roll 27. In the embodiment shown in FIG. 5, flotation is accomplished by casting a liquid film-forming material (polymer solution, curable monomer or prepolymer, etc.) 115 onto the surface of the liquid 119 in the bath 100. Essentially the same technique of flotation is used in the embodiment shown in FIG. 6. However, in FIG. 6 the flexible release substrate 235 is an endless belt similar to belt 35 in FIG. 1. A substantial portion of release substrate 235 is submerged below the surface on the liquid 219 in bath 200.

In FIG. 5, the flexible release substrate 113 is a thin web which is unreeled from roll 111 and taken up for discarding or reuse on roll 126. The contact between substrate 113 and the surface of the liquid 119 in bath 100 is at most tangential. In fact, it is preferred that substrate 113 contact only the cast membrane 113 so that it does not form a meniscus with liquid 119. The casting of the liquid polymer or polymer solution 115 through conduit 117 and down the incline surface 118 can be directed toward the tangential contact point 145 from either side of roller 149. It is permissable and even preferred to cast the polymer and float the resulting film 123a (shown in Phantom) so that the film 123a floats in the direction of movement of the upper half of roller 149 (i.e. the direction of movement of the resulting composite 114) rather than the lower half of roller 149. Casting and floating the membrane 123a as shown in phantom results in a slight rolling over of the edges of the membrane when it forms the upper layer of composite 114. These rolled over edges add strength to composite 114.

In one variation of the embodiment shown in FIG. 1, the separable composite 14b is dried in dryer 50a and taken up in a roll 25 for storage and/or subsequent processing. The composite 14b wound up on roll 26 is a useful intermediate product, somewhat similar to the product produced to the U.S. Pat. No. 3,551,244 and the aforementioned NIH report. However, these prior art products are true laminates which cannot be delaminated, i.e. the ultrathin polymer membrane or film cannot be separated from its support without seriously damaging the membrane. A unique property of composite 14b is that the support or substrate 13 for the ultrathin film 23 is a web with release characteristics. The presently preferred webs with release characteristics are papers or cellulosic fabrics (preferably woven) which meet the following requirements:

a. wet strength;
b. enough porosity to permit water uptake from the exposed surface;
c. sufficient smoothness to be operative (but a certain minimum of either roughness or fibrous character is desirable for better release);
d. dimensional stability with heating; and
e. ability to form a reversible bond with ultrathin membranes at the web/membrane interface. (Preferably, the bond should be loosened or totally reversed with water or steam.)

This last property is, of course, important with respect to separation of the ultrathin film from its release substrate or support and ultimate retrieval of the ultrathin film as flakes, a batt-like material, etc. Ultrathin films have a tendency to self-weld or autogenously bond to themselves or any surface, particularly a smooth surface. When the ultrathin film and a surface contacting it are both wet, evaporation of the liquid (e.g. water) at the interface between the surface and the film can increase the self-welding tendency. Accordingly, one way to reduce self-welding and favor separability (or reversible lamination) is to minimize the amount of moistening of the surface contacting the ultrathin film. (This is one of the principles involved in the method illustrated in FIG. 5.) Another principle which contributes to preventing the formation of irreversible bonds at the interface between the membrane and the supporting substrate is the possibility of reintroducing liquid or moisture into the interface, thus providing or re-establishing release characteristics in the support and, in effect, reversing the evaporation/lamination process described previously.

One means for maximizing release characteristics (or latent release characteristics which are activated upon wetting the release substrate) is to select for the support material a fibrous, web-like material, preferably comprising cellulosic fibers. Separation of the membrane from the support appears to depend on wetting the contact points between the film and the support, i.e. between the film and the fibers of the support. When the supporting web is a woven or non-woven fibrous cellulosic material (such as paper, cotton, linen cloth, ect.), the cellulosic fibers absorb water, and the contact points between the membrane and its support are re-moistened, reversing the bond at these contact points. Other liquid-absorbtive (preferably water-absorbtive) fibrous materials can be expected to produce similar effects, but such materials (e.g. cloth woven from polyvinyl alcohol fibers) are less readily available as compared to paper, cotton cloth, and the like. Furthermore, the cellulosic fibers swell several percent upon wetting, thus gently freeing themselves from the membrane which swells at a different rate or in a different manner upon wetting.

Certain films (i.e. non-fibrous materials) also have the ability to absorb water or other liquids and swell and thus could be used as substrates. Examples are "Cupraphane" (a type of cellophane) and hydrogel films.

Although fibrous cellulosic materials generally can be used to support the ultrathin film in a releasable manner, all fibrous cellulosic materials do not work with equal effectiveness. Some paper-like materials or waterlaid sheets contain high levels of chemical additives such as wet-strength agents, permanent press agents, finishes, re-wet agents, and the like. Some of the very high wet-strength papers re-wet too slowly to be used efficiently in the process of this invention. Other types of paper additives can irreversibly weld the membrane to the support when heat is applied to the ultrathin film/support laminate, e.g. during drying.

Accordingly, the release characteristics of a support material, when water is used to re-wet the ultrathin film/support interface, can be enhanced by the addition of the water of materials that speed up re-wetting of the substrate, e.g. soaps, synthetic detergents, water soluble solvents such as the $C_1$-$C_3$ alcohols, etc. However, the surface tension of the re-wet bath or flotation bath (e.g. bath 30) should not be lowered to the point where the ultrathin film will not float on the water. If the ultrathin film sinks into the water or becomes submerged, it is very difficult to handle. The submerged film tends to wrinkle and be torn by currents in the water caused by pulling the film through the water.

Further factors which facilitate or provide release characteristics are as follows:

First, the substrate should not be too thin or too low in weight per unit area. For example, for maximum release characteristics it is preferred that a support web weigh at least about 50 grams per square meter, and a weight in excess of 100 grams per square meter is even more preferable.

Second, as pointed out previously, the web should have good water absorbtion characteristics. Thus, relatively hydrophobic synthetic fabrics or even heavily finished cotton goods or cloth given a permanent press treatment can permanently laminate to the ultrathin film either by evaporation of water at the film/support interface or by application of heat, e.g. during drying.

Third, smooth substrates (e.g. polymeric films) are more likely to laminate than fibrous or rough substrates. It can be extremely difficult to reintroduce water or some other wetting agent into the interface between, for example, an ultrathin film and a solid sheet of polyethylene plastic.

Fourth, drying temperatures above the boiling point of water, e.g. as high as 250°C. or 500°F. appear to help lift the ultrathin film off of its support. Although this invention is not bound by any theory, it is theorized that drying conditions should be selected such that all the water or moisture in the potentially separable composite is not removed from the side not covered with ultrathin film. That is, it is preferred to use conditions which cause the water in the support to "attempt" to leave from the side covered with ultrathin film, thereby lifting the ultrathin film off the support. Both high temperatures and relatively thick and/or heavy webs appear to contribute to these desired conditions. For example, it has been found that porous paper 1–2 mils (25–50 microns) thick, preferably uncalandered, is suitable for use in this invention. One such porous paper 1–1.5 mils thick and commercially designated "7TT" is made by the Peter J. Schweitzer Division of Kimberly-Clark Corporation. This type of paper is particularly well suited for use as the flexible release substrate 13 of FIG. 1, especially when composite 14*b* is taken up on roll 26 in the variation of the method of FIG. 1 described subsequently.

In casting an ultrathin film according to FIG. 1, the liquid film forming material 15 (e.g. a polymer solution, curable liquid polymer material, or the like) is stored in a reservoir and released through conduit 17 onto inclined surface 18. A caliper control device 21 (e.g. a knife blade) meters or doctors out enough material to form the ultrathin polymer film or membrane 23 on the surface of the liquid 19 in formation bath 10. Liquid 19 preferably comprises water which, though it has a specific gravity lower than many of the polymers used to form ultrathin films, has sufficiently high surface tension to keep the case ultrathin film 23 afloat. The flexible release substrate 13 is unwound from the storage roll 11 and submerged in the bath. The floating, freshly cast ultrathin film 23 floats across the surface of the liquid 19 until it becomes transferred to and supported by the release substrate 13 at the confluence 45*a* of the film 23 and the substrate 13. After trimming of the edges of substrate 13 with trimmer 25 (the trimmer for the opposite edge is not shown) the resulting composite 14*b* (i.e. the ultrathin film supported on the release substrate) is dried in dryer 50*a* and wound up into a roll 26. This formation of composite 14b can be considered to be semi-continuous. The formation bath can be operated as described previously (so long as there is film-forming material 15 in the reservoir) until roll 11 has been completely converted into composite 14b wound up on roll 26. Roll 26 can then be removed for further processing or stored and a new roll 11 can be started. Drying of composite 14b in dryer 50a provides a substantially stable intermediate product. By "stable" is meant the ability of this product to be handled, treated, and stored without undue damage to the ultrathin film or excessive separation of the ultrathin film from its web-like substrate or support. This stable intermediate product is a laminate; however the laminate can be de-laminated through rewetting in bath 30. This stable, separable laminate 14b is a desirable means for permitting low-volume users of the ultrathin to buy small quantities of composite 14b for on-the-job retrieval and use of ultrathin polymer film. Another purpose of the stable intermediate product is to provide enough support for the ultrathin membrane, so that the membrane can be given various pre-treatments. By "pre-treatment" is meant a treatment prior to the retrieval step. Ordinarily, a single layer, or even several layers, of retrieved membrane film lack sufficient strength to be manipulated for the purpose of pre-treatment with radiation (including X-rays, gamma rays, electron bombardment through corona discharge, etc.), coating agents, metallizing, or the like. The stable intermediate, however, can be pulled at great speed over rolls, quickly wound and unwound, passed under coating heads (spray heads, knife coaters, etc.), through curtain coaters, and passed various other mechanical, electro-magnetic, or chemical alteration steps such as passage through vacuum systems for coating by evaporation of metals (e.g. sputtering electrodes). Some or all of these alteration steps are likely to weaken the ultrathin membrane, but the support web prevents undue loss or distruction of ultrathin material. If the pretreatment is a coating step, the thickness of the coating can range from a monomolecular layer up to a layer which averages 5 or 10 microns thick.

A roll 26c of the "pre-treated" composite (or laminate) 14c can then be unwound and conveyed to the re-wet bath 30. Take-up of composite 14b as roll 26 and feeding of roll 26c to the re-wet bath 30 can be avoided by inserting appropriate treating stations 20 (e.g. a coating head or a drying zone followed by a metallizing zone) such that the intermediate product flowing from bath 10 is treated prior to being fed to bath 30. However, as will subsequently become clear, the "retrieval" step generally has a rate-determining effect on the preceding steps of the process. Semi-continuous production of roll 26, followed by "pre-treatment" of the product in roll 26 to provide the composite 14c of roll 26c can, under appropriate conditions, be faster and more efficient than a single flow-through continuous process from roll 11 to "retrieved" ultrathin film roll 70. Some of the previously described "treatments" of the polymer film can be carried out at rates up to 100 feet per minute or faster, so long as the ultrathin polymer film or membrane is in the composite or reversibly or separably laminated form 14b. The retrieval step may have to be operated at speeds as low as 5 feet per minute, and speeds in excess of 25 feet per minute difficult to achieve. Accordingly, operating the entire process at the speed of the retrieval step could be very uneconomical if a "pre-treatment" were desired.

On the other hand, the take-up and re-feeding steps shown in Phanton in FIG. 1 permit rapid "pre-treatment". It should be noted that even the formation of composite 14b can be carried out faster than the "retrieval" step. For example, this formation step can be carried out at a rate of 10 to 30 feet per minute (20 ft/min) as compared to the typical retrieval speeds of 5–25 ft/min. (more typically 10 – 20 Ft./min.).

The composite 14a or 14c which is to be de-laminated in bath 30 is first conveyed by an appropriate conveying means through a pre-wetting zone 40. In the event that composite 14a is still reasonably moist from its contact or immersion in the liquid 19 in bath 10, the pre-wetting zone 40 can be eliminated. The ultrathin film/release substrate composite 14 is passed onto a chute 42 with the substrate or web side down and the ultrathin film facing upward. Pre-wetting of the web in zone 40 or an equivalent pre-wetting treatment loosens the weak bond at the interface between the substrate 13 and the ultrathin film 23. As a result, the ultrathin film 23 separates from the web very rapidly (i.e. in 1 to 10 seconds) upon reaching the surface of bath 30, thus becoming a free floating film 23d. A suitable arrangement of rollers pulls the delaminated web or substrate 13 back away from the rapidly separating film 23d to facilitate flotation of film 23d and also to permit collection of the de-laminated substrate 13 on take-up roll 27. With proper control of the formation, pre-treatment, and flotation conditions, the spent web or substrate 13 can be recycled to the casting or formation bath 10. Alternatively, if costs permit, the spent or recovered substrate 13 can be simply discarded. In bath 30, a suitable gearing arrangement 43 (shown in phantom) causes an endless belt 35 to move at approximately the same speed as the feed rate of the composite 14a or 14c to the bath 30. This gearing arrangement 43 permits the flotation step to be operated in a generally smooth, continuous manner. The aforemention pre-wetting step in zone 40 (or an equivalent step or condition) permits the flotation step to be carried out at least as rapidly as the retrieval step, described subsequently.

Endless belt 35 takes up the floating ultrathin film 23d at the confluence 45 of the film and the belt. The result is a new separable composite 44, which is preferably more weakly laminated than composite 14a or 14c. All of the preceding discussion regarding release characteristics of substrates is fully applicable to endless belt 35. In fact, it is preferred that virtually no bond at all be formed between belt 35 and ultrathin film 23d. The separable composite 44 can be (and preferably is) fed directly to a drying zone, as shown in FIG. 2.

A preferred design for the endless belt 35 is shown in FIG. 3. For long life, durability, and continuous re-use, endless belt 35 can comprise a heavy-duty, flexible link belt structure 36 covered with a fairly heavy cotton woven material 37. The heavy-duty metal belt 36 can comprise, for example, stainless steel and need not have a continuous or smooth upper surface in order to adequately support woven web 37 (e.g. open, uncovered links provide sufficient support for the web). At least by the time the endless belt structure 35 has emerged from the drying zone 50 (FIG. 2), there is little or no bond between ultrathin film 23d and material 37. When very slight tensile forces are applied (e.g. by rotation of retrieval roll 70), film 23d is released immediately from belt 35 and is easily peeled off or separated. The preferred form of belt 35 is continuously useable for months at a time. In the event that the woven web 37 becomes worn or begins to deteriorate, it is only necessary to replace this element, and the link belt support 36 remains structurally sound.

In the embodiment of the process illustrated in FIG. 5, the bath 100 is similar to the bath 10 of FIG. 1. The liquid 119 in bath 100 is preferably water. The film forming material 115, the conduit 117, and the inclined surface 118 can be constructed or used or arranged in a manner analogous to the corresponding elements 15, 17, and 18 of FIG. 1. The supply roll 111 is analogous to supply roll 11 of FIG. 1, and the flexible substrate 113 can comprise the same material and have the same release characteristics as described for flexible release substrate 13 of FIG. 1.

The arrangement of the roller 149 with respect to the release substrate 113, the tangential contact point 145, and the resulting composite 114 have already been described. The manipulation of the casting step so as to provide flotation of the ultrathin film 123 has also been described. It will be noted from this previous description that substrate 113, though similar in structure and function to substrate 13 of FIG. 1, can also serve some of the support and release functions of belt 35 of FIG. 1. With the configuration shown in FIG. 5, it is possible to vary the strength of the bond between substrate 113 and ultrathin film 123 (which make up the separable composite or reversibly bound laminate 114). For example, if substrate 113 is substantially dry when it contacts the floating ultrathin membrane or film 123 at the tangential point 145, the result can be a composite 114 which is characterized by a total or almost total lack of bonding between the substrate 113 and the film 123. In fact, for pre-treatments and the like which require rough handling of the composite 114, it can be desirable to increase the bonding between the substrate 113 and film 123, e.g. by a corona discharge treatment which "tacks down" the film 123 and prevents it from being too easily dislodged or lifted off substrate 113 by, for example, hot air currents in drying zone 150b.

On the other hand, a fairly strong but reversible bond can be provided at the interface between substrate 113 and film 123 through the use of a pre-wetting zone 140, which typically consists of water jets directed at the underside of substrate 113. The pre-wetting zone 140 can be similar in structure to pre-wetting zone 40 of FIG. 1, even though wetting zone 140 has an almost exactly opposite purpose; namely, to facilitate lamination of ultrathin film 123 to its support substrate 113. The resulting laminate 114 is still a separable composite, since even strong drying conditions (e.g. strong upward currents of hot air in dryer 150b or (shown in Phantom) or dryer 150 can reverse the bond between the substrate 113 and the film 123.

Other means for pre-wetting substrate 113 can be used, e.g. running the release substrate 113 over a roller partly immersed in water (as in a roller-coating device) prior to contacting substrate 113 with the ultrathin membrane 123 floating on the surface of bath 100. This technique is somewhat more difficult to control than the water spray or water jet approach.

In the event that the composite 114 emerges from the bath 100 in a substantially unbonded state and is later tacked together, one suitable means for accomplishing this involves passing the composite 114 under a corona discharge electrode while holding the composite 114 at ground. The electron bombardment creates a static electric charge on the ultrathin film, and the resultant electro-static force holds the film 123 to the support 113.

For preparing ultrathin film or ultrathin membrane products which require no "pre-treatment", the process schematically illustrated in solid lines in FIG. 5 is preferable, at least in terms of its simplicity. A pre-treatment station or zone 120 (shown in phantom) can be included in the process of FIG. 5, bearing in mind the rate-determining tendency of the "retrieval" step, described previously. Thus, the process of FIG. 5 is in many ways the most flexible embodiment of this invention. Alternatively, composite 114b can be dried in dryer 150b and taken up on roll 26 (all shown in phantom). Roll 26 can be unwound and "pretreated" to produce the feed roll 26c of FIG. 1 — or to produce feed roll 126c of FIG. 5. The use of roll 126c eliminates the need for zone 120.

In the process illustrated in FIG. 6, casting of the film-forming material 215 through the use of analogous equipment (conduit 217, inclined surface 218, etc.) is used to provide the floating film 223, from which the separable composite 224 is formed directly (as in the case of the process of FIG. 5, wherein composite 114 is also formed directly from the cast film and a substrate). However, in this embodiment, the substrate for the separable composite 224 is a cloth-covered heavy-duty endless belt 235 essentially similar in structure to belt 35 of FIGS. 1 and 3. Thus, although the composite 224 can be (and normally is) passed through a dryer 250 as in the processes illustrated in FIG. 1 and in FIG. 5, rapid "pre-treatment" is difficult to provide. First, endless belt 235 would have to be long enough to pass the composite 244 through a pre-treatment zone. Second, composite 224, unlike composite 14 of FIG. 1, is not a stable intermediate which can be taken up in roll form and handled in the manner normally required for rapid pretreatment. However, since "pretreatment", though preferred, is optional in the process of this invention, there are situations where the durability of endless belt 235 makes the process of FIG. 6 particularly useful.

DRYING

In this invention, full or partial drying of the ultimately obtained separable composite (44 of FIG. 1, 114 of FIG. 5, and 224 of FIG. 6) precedes separation of the ultrathin film (23d, 123, or 223) from the flexible release substrate or support 35 or 113 or 235. Drying can be carried out very efficiently in a gas-fired hot air dryer 50 (FIG. 2). Dryer 150 of FIG. 5 and dryer 250 of FIG. 6 can be the same as or similar to dryer 50. (Driers 50a and 150b, though shown much smaller than dryer 50 for convenience of illustration, are similar in structure and may even have to be larger than dryer 50.) Dryer 50 preferably comprises a blower 51 which blows air upwardly along the entire length of the dryer so that there are upward hot air currents throughout the drying zone, a heating element 55 which consists of a burner comprising gas jets extending along the length of the dryer, and a grate or formaninous support element 57 which defines a porous bottom wall in the drying zone or heating tunnel provided by the dryer structure.

Belt 35 and ultrathin film 23d (i.e. separable composite 44) is conveyed along the upper surface of grate element 57. The strong upward air flow in the heating chamger 53 below grate 57 passes upwardly through grate 57 and through belt 35 and exerts a gentle force on the ultrathin film 23d, thus helping to facilitate separation of film 23d from its supporting belt 35. The ambient temperature at the grate 57 is high enough to insure the application of drying temperatures in excess of 100°C. to composite 44. Drying temperatures up to 250°C. can be used; however, it is preferred that the drying temperature be below 200°C.

Gas-fired hot air dryers of the general type shown in FIG. 2 are well-known and are presently available from dryer manufacturing companies. For the processes shown in FIG. 5 and FIG. 6, the composites (114 and 224, respectively) are handled substantially as shown in FIG. 2, except that dryer 150 would have a much smaller evaporating job to do in the case of the process shown in solid lines in FIG. 5. When the belt (35 of FIG. 1 or 235 of FIG. 6) is immersed in water, the release substrate or layer (e.g. 37 of FIG. 3) can absorb several times its weight in water. The water absorbtion in the composite 114 of FIG. 5 tends to be considerably less than this.

SEPARATION AND RETRIEVAL

The following description of separation and retrieval steps applies rather generally to the various embodiments of this invention. The separation step is preferably preceded by a particle application or dusting step for anti-blocking purposes. The particle application zone typically comprises a dispensing means 60 and can also include an infrared heating treatment provided by, for example, an infrared lamp 62. When a multilayer, batt-like material containing trapped air (which has good heat insulative values and very low weight) is desired, it is possible to permit some autogenous bonding or self-welding of laminae without sacrificing trapped air. This is accomplished through a corrugating or wrinkling effect which will be described subsequently. If the corrugating or wrinkling of the laminae is sufficiently well controlled to limit the contact points and self-welding points between layers in the layered structure, the dusting step (hence the particle application zone) can be omitted, and the composite 44 emerging from the dryer can be directly subjected to separation and retrieval.

The particle applicator or dispenser 60 of FIG. 2, shown in greater detail in FIG. 4, is substantially the same as the dispenser in the particle application zones 160 of FIG. 5, and 260 of FIG. 6. The applicator or dispensor 60 preferably comprises a fabric bag 61 which contains a parting agent or anti-blocking agent 63. A shaking motion is applied to bag 61 by means of a pivotable arm 63 and rotating cam 65. Equivalent mechanical shaking means will occur to those skilled in the art. The pores in the fabric of bag 61 are sufficiently large to permit particles of the anti-blocking agent 63 to pass from the interior of bag 61 onto the surface of ultrathin film 23d so as long as the bag is subjected to the shaking motion. Other means for applying a particulate anti-blocking agent (e.g. solid aerosol dispenser devices) can be used. After passing through particle application zone 60, the exposed surface of film 23d is covered with a layer 64 of anti-blocking agent 63. By this time, the film 23d is preferably free of residual moisture.

In the separation zone 67 (FIG. 4) the dry ultrathin film 23d is gently pulled away from the release substrate 37 of belt 35 by gentle tensile forces. Continuous separation in this manner permits continuous "retrieval"; hence, the possibility of high volume production of ultrathin film in bulk form.

In the preferred retrieval method, the ultrathin film 23d is taken up by a driven roller to form a convoluted roll comprising a continuous length of film, each convolution of film (produced by rotation of the roller) being separated from the next inner-most convolution by layer 64 of anti-blocking agent 63.

A typical retrieval zone of this invention comprises a support arm 73, a variable or programmed drive 71, a roller or spool or spindle 75 driven by drive 71, and the resulting convoluted roll 70. Arm 73 is supported at one end to permit smooth upward or downward adjustment of the height $h$ of roll 70 above the upper surface of the portion of film 23d which is directly below roll 70. Superior retrieval of ultrathin can be achieved when retrieval roll 70 (FIG. 4) is kept at a slight distance $h$ above a substantially horizontal portion of the film 23d on the endless belt 35, e.g. 40 – 160 mils (1-4mm), typically 1/32 to ⅛ of an inch. A purpose of arm 73 is to maintain this desired distance. However, $h$ can be reduced to zero is an adequate anti-blocking treatment is used prior to retrieval and provided the weight of roll 70 is not allowed to rest heavily on the film 23d beneath it.

It is a feature of this invention that the motor drive 71 for the retrieval roll is independent of the drive for endless belt 35. If the endless belt drive and the roll drive 71 are connected in any way, it is preferred that they be connected by servo circuitry or the like according to a program whereby, once the retrieval process has started and reached a more or less steady state, the linear speed of the periphery of the retrieval roll can increase or decrease slightly with respect to the endless belt speed. (This linear speed is given by the expression $r\omega$, wherein r is the radius of roll 70 and $\omega$ is the angular velocity of the roll.) Alternatively, the servo circuitry can be provided with a manual override, and a fixed relationship of linear speed of the periphery of the retrieval roll and the speed of the endless belt can be varied manually. One purpose of this speed variable is to vary the slack in the separation zone, i.e. the area between the zone of separation 67 and the point of contact with the periphery of roll 70.

As will be apparent from FIG. 4 (as well as from FIG. 2), the unsupported membrane or film 23d taken up by retrieval roll 70 has a slack portion, so that it is not torn or damaged by tensile forces exerted through the rotation of roll 70 (shown in FIG. 4 as a counterclockwise rotation). The amount of slack can be controlled by varying the relative linear speed of the periphery of retrieval roll 70 and the speed of endless belt 35. It is generally considered preferable to keep the speed of the endless belt constant and permit the linear roll speed to vary.

Figure 7:
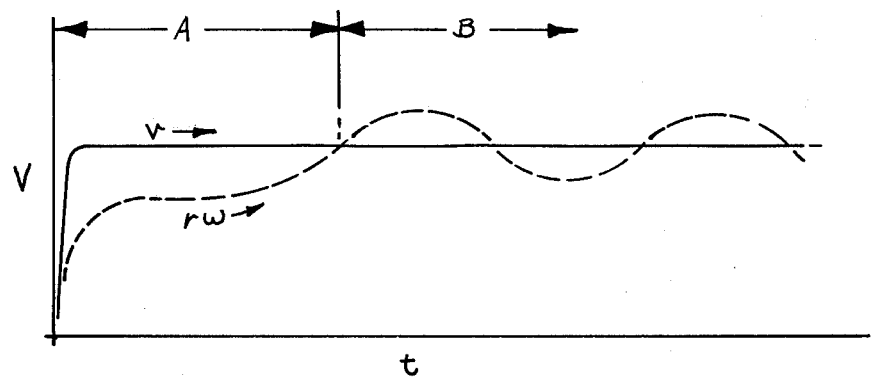
FIG. 7 is a plot of the linear speed of the periphery of the retrieval roll vs. the retrieval time in the retrieval step shown in FIGS. 2, 4, 5, and 6.

A typical plot of linear speed (V) vs. time elapsed in the operation of the process ($t$) is shown in FIG. 7. The V vs. $t$ plots shown in FIG. 7 include a plot of the belt speed $v$ and the linear speed of the periphery of the retrieval roll 70, expressed as the radius of roll 70 ($r$) times the angular velocity ($\omega$) of roll 70. During start-up of the process, the belt speed $v$ is brought up quickly to its constant, steady state speed. However, the linear roll speed approaches speed $v$ rather slowly throughout the start-up period indicated by area A on the plot. This lag in matching the two speeds permits a slight amount of slack to build up, as illustrated in FIG. 4, thus protecting the film 23d from tearing or breaking. Once a steady state (area B of the plot) has been reached, it can be desirable to either increase or decrease the amount of slack between the endless belt 35 and the contact point with roll 70. This is because the slack occasionally becomes too great, and some tightening is desirable; alternatively, over-reduction of the slack can create the danger of breakage, and the slack must then be increased.

Another reason for varying the linear speed of the roll periphery with respect to $v$ is to control the amount of air trapped in the retrieved polymer. This method of controlling trapped air is particularly useful when the dusting (anti-blocking) step is omitted and an autogenously bonded batt is desired.

The particulate layer 64 of anti-blocking agent 63 and/or other features of the retrieval step prevent autogenous bonding of the smooth membrane surfaces when the membrane is wound up.

Another method of preventing autogenous bonding of the layers of film or membrane is to use a film with an uneven surface. Membranes made of polyethylene and polypropylene have naturally microscopic "pebbled" surfaces. The membranes can be readily prepared from hot casting solutions (greater than 100°C.) on hot water (water heated to greater than 70°C.). Such membranes can eliminate even the need for the anti-blocking agent 63. Still another method for eliminating the need for anti-blocking agent 63 is the wrinkling or corrugating effect achieved by varying $r\omega$ with respect to $v$, as described previously.

Other methods of retrieval (i.e. conversion of the ultrathin film to bulk form) will occur to the skilled technician. For example, the separated ultrathin film can be comminuted to form dry, separable flakes. Special apparatus is needed for this cutting technique, however. Examples of such special cutting apparatus are compressed air jets and laser beams. In any event, it is difficult to obtain flakes of regular size by such techniques. Still another retrival technique involves cutting off large segments of separated film and forming the segments into a stack of laminae separated by the anti-blocking agent. Still another technique involves a reciprocal folding motion, which forms a continuous film into a stack of generally horizontal laminae with creased folds at the edges of the stack.

To facilitate separation of composite 44 or 114 or 244, an upward blast of steam, compressed air, or the like can be used in lieu or or in addition to a de-lamination bath (e.g. bath 30).

RAW MATERIALS USED IN THE PROCESS

The materials used for release substrates have already been described. The film-forming material 15 can be a curable monomeric or polymeric liquid, but is preferably a polymer solution. Suitable polymers for formation of ultrathin films and membrane are described in the aforementioned NIH report, Nih-NHLI-71-2364D-1 and U.S. Pat. No. 3,551,244. The presently preferred class of polymers is the polysulfones, but ultrathin films can also be made from acrylic polymers, nitrile polymers, butadiene and butadiene-styrene polymers, poylsaccharides (including cellulosic polymers), halogenated polymers such as chlorinated polyethers, polyamides, polycarbonates, polyphenylene oxide, vinyls, polyesters, polyolefins, and other thermoplastic and thermosetting resins. To prepare a casting solution, the polymers typically disolve in a solvent to give a solution having a consistency of about equal to varnish or light syrup. The casting solution typically contains 25 – 99% solvent.

Although water is preferred for used in the casting or formation bath, the casting solution will spread spontaneously when poured on other liquid surfaces, including liquids such as glycerin, mercury, and the like. The term "water", with regard to a water bath, should be understood to include aqueous solutions of inorganic salts, acids, bases, sugars, alcohols, urea, etc.

Various particulate materials, both coarse (e.g. −10 mesh) and fine (e.g. −325 U.S. mesh) are suitable for the anti-blocking agent. Among these are inorganic materials such as talc (powdered magnesium silicate), precipitated or ground calcium carbonate, silica, and the like. Organic materials such as powdered polyethylene or polypropylene are also effective. All anti-blocking agents do not work with equal effectiveness, and the presently preferred agent is commercially available under the trademark "Microfoam" (Dow Chemical Company). "Microfoam" granules are 10 – 20 microns in diameter, but upon heating, they expand to 40 to 70 times their original volume.

PRODUCTS OBTAINABLE FROM THE PROCESSES OF THIS INVENTION

FIGS. 8 – 11 illustrate retrieved materials. Batt-like material 80 (FIG. 8) comprises a large number of ultrathin film laminae 23 separated by layers 64 of anti-blocking agent. Batt-like material 85 comprises wrinkled or corrugated ultrathin laminae 83, which are self-welded at their contact points. The wrinkles result in the formation of trapped air pockets.

Figure 11:
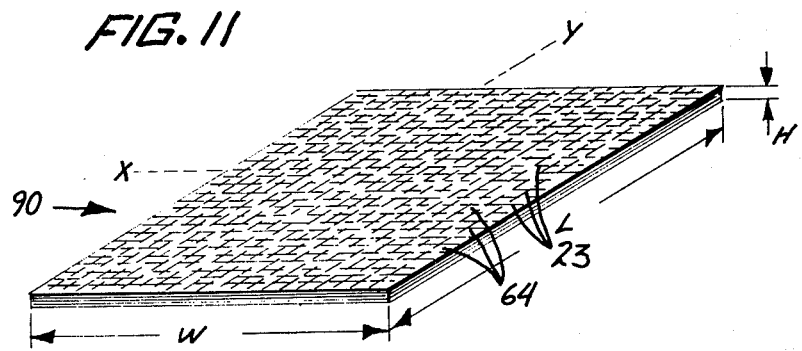
FIG. 11 is a perspective view of a batt made according to this invention which has been reduced in size and cut lengthwise and widthwise to form flakes of uniform size.

FIG. 11 illustrates a portion 90 of the batt-like material 80 which has been reduced in size and cut for flake formation. The length dimension L of portion 90 is typically 3 or 4 feet. (90 or 120cm). The width dimension W is typically 1.5 to 3 feet (45 – 90cm) and will generally be about equal to the width of the retrieval roll 70. The thickness H of portion 90 has been reduced to 0.1 – 1 inches (2.5 – 25mm). The portion 90 of the batt-like material can be cut along horizontal and vertical lines $x$ and $y$ to produce flakes, e.g. flakes 10mm × 10mm in size. Cutting with a razor blade does not produce edge bonding and permits retrieval of a mass of discrete flakes; provided that the anti-blocking layers 64 have been properly provided. (It will be understood that the number of ultrathin film layers 23 and intermediate anti-blocking layers 64 has been greatly reduced for purposes of illustration, and the spacing between the layers has been greatly exaggerated for the same reason.)

As pointed out previously, the thickness of the ultrathin film layers is normally less than 2.5 microns. Ultrathin layers less than 1 micron in thickness (e.g. 0.1 micron) have been achieved in practice.

It is permissible to ship the retrieved polymer in roll form to a manufacturer for in-line cutting operations, e.g. in the fabrication of liners for winter clothing. On the other hand, it may be desirable to employ some form of size reduction before any further processing of the retrieved ultrathin film. Typical methods of size reduction include cutting with a shears, scissors, or a guillotine blade and slitting with a sharp cutting edge such as a razor blade. Cutting with some shear force generally results in edge bonding of the batt where it has been cut. Slitting with a razor blade or the like does not produce this effect.

Figure 9:
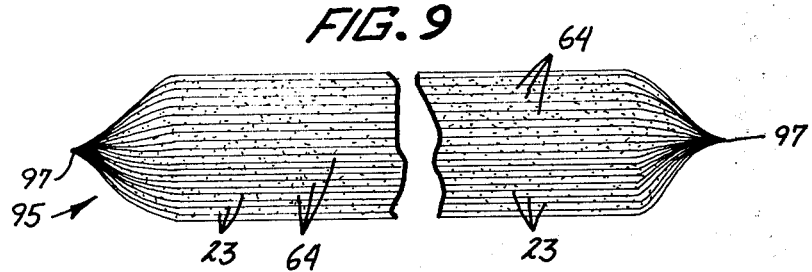
FIG. 9 is a fragmentary cross-sectional view, greatly enlarged, of an edge-bonded batt of this invention, where the batt contains anti-blocking agent in between laminae thereof.
Figure 10:
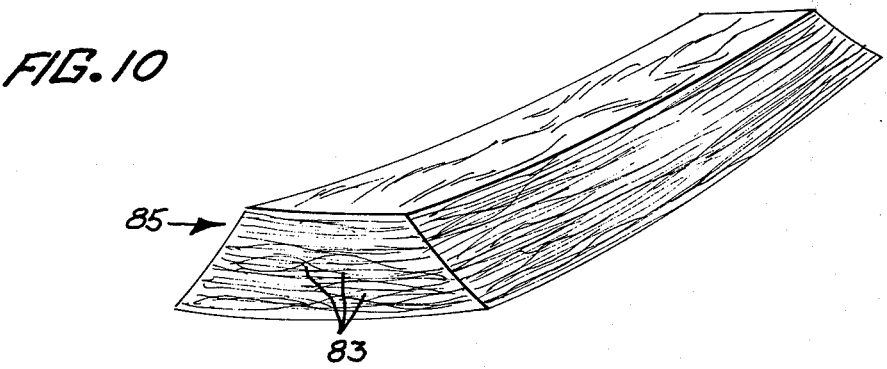
FIG. 10 is a perspective view of a batt made according to this invention, where the batt has not been given an anti-blocking treatment but nevertheless contains trapped air.

FIG. 9 illustrates a multi-layer batt 95 (similar in size to batt 90) which has been edge bonded at 97 by cutting with an ordinary scissors.

Applications of batt-like material produced according to this invention include cushioning means (e.g. in shock pads), acoustical insulation, thermal insulation, light-weight ceiling tiles, buoyancy materials, and the like. In these applications, any suitable outer covering can be used for confining the batt or imparting strength, water or solvent resistence, or radiation-reflective characteristics to it. One suitable envelope or outer covering for the batt is a sheet of aluminum coated polyester (e.g. polyethylene terephthalate) film.

The batt can be inserted loosely in the outer covering or it can be laminated to an outer layer of a polymer film at its major surfaces.

Approximately 500 grams of the batt 80 shown in FIG. 8 contains about 200 square meters of retrieved ultrathin film or membrane. In large scale production, several kilograms of this batt material can easily be produced in a day's time. For example, a retrieval rate of about 3 meters per minute can produce about 1 – 3 kg per day on a 45cm × 30cm roll.

Very thin batts (e.g. less than 100 microns thick) can be used to make reverse osmosis membranes, filters, and the like. Desirable filtering effects can be obtained with one or more membrane thicknesses up to a total thickness of about 5 to 10 microns.

When flakes are produced, (e.g. by cutting as illustrated in FIG. 11), the resulting mass of flakes can be given an electrostatic charge and used in dust collection. Another use for the flakes is to coat them with a hyrophilic agent. Upon dispersal in air, the resulting hydrophilic flakes can be used to disperse a fog band or the like. It has been found that flakes 0.1 – 1.0 microns in thickness settle in still air at approximately the same rate — about 10cm per second. In turbulent air, the settling rate is considerably slower.

What is claimed is:

1. A method for making unsupported ultrathin polymer film having autogenous bonding characteristics when moist comprising the steps of:
    a. floating an ultrathin polymer film having an ultrathin caliper less than 2.5 microns on the surface of a liquid bath capable of supporting said ultrathin polymer film;
    b. contacting a surface of the floating ultrathin polymer film with a surface of a flexible release substrate to form a flexible separable composite comprising said film having an exposed surface and said release substrate;
    c. at least partially drying said separable composite;
    d. applying a particulate anti-blocking agent to the exposed surface of said ultrathin polymer film portion of said composite and separating said ultrathin polymer film from said release substrate; and
    e. retrieving the thus-separated, unsupported ultrathin polymer film in bulk form.

2. A method according to claim 1 wherein said retrieving step includes taking up said unsupported ultrathin film with a driven roller to form a convoluted roll, each convolution of said convoluted roll being separated from the next inner convolution by a layer of said particulate anti-blocking agent.

3. A method according to claim 1 wherein said step (b) includes bonding said ultrathin polymer film to said release layer by autogenous lamination at the interface between them with inherent cohesive forces, and wherein said release layer is selected to provide inherent cohesive forces which are weak enough to permit delamination of said separable composite without damage to said ultrathin polymer membrane.

4. A method according to claim 3 wherein said separating is carried out by treating said separable composite with said liquid or gaseous water.

5. A method according to claim 1 wherein said separable composite formed by said step (b) is passed through a drying zone in step (c) maintained at a drying temperature above 100°C.

6. A method according to claim 1 wherein said method is continuous and wherein said flexible release layer comprises a continuously moving carrier web.

7. A method according to claim 1 wherein said floating step is carried out by casting said ultrathin polymer film on the surface of said liquid bath.

8. A method according to claim 5 wherein the drying of said separable composite is carried out by:
    conveying said separable composite through said drying zone with said film facing upward and said release substrate facing downward, and
    exposing said release substrate of said separable composite to upward currents of heated air in said drying zone, whereby said release substrate is raised to a temperature in excess of 100°C. but less than about 250°C.

9. A method according to claim 2 wherein the separated, unsupported ultrathin polymer film is fed to said convoluted roll at a substantially constant linear feed rate and the linear speed of the periphery of said convoluted roll is maintained substantially equal to said feed rate.

10. A method for making unsupported ultrathin polymer film having autogenous bonding characteristics when moist comprising the steps of:
    a. floating an ultrathin polymer film having an ultrathin caliper less than 2.5 microns on the surface of a liquid bath capable of supporting said ultrathin polymer film;
    b. contacting a surface of the floating ultrathin polymer film with a surface of a flexible release substrate to form a flexible separable composite comprising said film having an exposed surface and said release substrate;
    c. at least partially drying said separable composite;
    d. separating said ultrathin polymer film from said release substrate; and
    e. retrieving the thus-separated, unsupported ultrathin polymer film in bulk form by feeding said ultrathin polymer film to a driven roller at a linear feed rate which alternatively is increased and decreased with respect to the linear speed of the periphery of the resulting convoluted roll.

* * * * *

UNITED STATES PATENT OFFICE
CERTIFICATE OF CORRECTION

PATENT NO. : 3,933,561
DATED : January 20, 1976
INVENTOR(S) : Roy E. Larson and Ralph H. Forester, Jr.

It is certified that error appears in the above-identified patent and that said Letters Patent are hereby corrected as shown below:

In column 8, line 58, for "case" read --cast--.

In column 12, line 22, for "224" read --244--.

In column 12, line 26, for "224" read --244--.

In column 12, line 28, for "224" read --244--.

In column 12, line 34, for "224" read --244--.

In column 12, line 45, for "224" read --244--.

In column 13, line 11, for "224" read --244--.

In column 14, line 20, for "is" read --if--.

In column 15, line 37, for "retrival" read --retrieval--.

In column 15, line 46, for "or or" read --of or--.

In column 15, line 65, for "disolve" read --dissolve--.

In column 17, line 31, for "hyrophilic" read --hydrophilic--.

In column 17, line 32, for "band" read --bank--.

Signed and Sealed this eighth Day of June 1976

[SEAL]

Attest:

RUTH C. MASON
Attesting Officer

C. MARSHALL DANN
Commissioner of Patents and Trademarks